United States Patent
Sayre

(10) Patent No.: US 9,212,687 B2
(45) Date of Patent: Dec. 15, 2015

(54) TWIST LOCK FLAT THRUST WASHER ASSEMBLY

(71) Applicant: Schaeffler Technologies GmbH & Co. KG, Herzogenaurach (DE)

(72) Inventor: Daniel Sayre, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 47 days.

(21) Appl. No.: 14/271,160

(22) Filed: May 6, 2014

(65) Prior Publication Data

US 2014/0356102 A1 Dec. 4, 2014

Related U.S. Application Data

(60) Provisional application No. 61/830,948, filed on Jun. 4, 2013.

(51) Int. Cl.
| | |
|---|---|
| *F16B 43/00* | (2006.01) |
| *F16D 1/00* | (2006.01) |
| *F16C 19/30* | (2006.01) |
| *F16B 4/00* | (2006.01) |

(52) U.S. Cl.
CPC .................. *F16B 43/00* (2013.01); *F16C 19/30* (2013.01); *F16D 1/00* (2013.01); *F16B 4/004* (2013.01)

(58) Field of Classification Search
CPC ......... F16B 43/00; F16H 41/28; F16D 33/18; F16D 1/00; B21D 28/02
USPC ............ 411/533, 531; 60/365, 366, 338, 330; 192/110 B, 172, 3.25, 3.21, 3.28, 3.29; 384/590, 420, 123, 127
See application file for complete search history.

(56) References Cited

U.S. PATENT DOCUMENTS

| | | | | |
|---|---|---|---|---|
| 3,202,250 | A * | 8/1965 | Fulton | 192/45.1 |
| 4,341,294 | A * | 7/1982 | Kerr | 192/45.005 |
| 4,608,823 | A * | 9/1986 | Maze | 60/361 |
| 5,489,255 | A | 2/1996 | Hinckley et al. | |
| 8,371,116 | B2 | 2/2013 | Mueller et al. | |
| 2001/0033704 | A1 * | 10/2001 | Jackson | 384/420 |
| 2009/0159390 | A1 * | 6/2009 | Davis | 192/45.1 |
| 2012/0055754 | A1 * | 3/2012 | Mueller et al. | 192/110 B |

FOREIGN PATENT DOCUMENTS

WO    WO 2011/006463  A1 *  1/2011

OTHER PUBLICATIONS

"Hyundai A8TR1 Flange Locking Thrust Washer" dated Jan. 1, 2012.
"Allison 310 Flat Locking Thrust Washer" dated Jan. 1, 2012.

* cited by examiner

*Primary Examiner* — Roberta Delisle
(74) *Attorney, Agent, or Firm* — Volpe and Koenig, P.C.

(57) ABSTRACT

A thrust washer assembly including a washer and a ring is provided. The washer includes a circumferential outer surface that varies radially from an axis of the washer to define a plurality of ramps. The ring includes a plurality of axial protrusions that each includes an inner radial surface that, via a relative rotation of the washer to the ring, engages a radially outer surface of the plurality of ramps to connect the washer and the ring by a friction-fit connection.

14 Claims, 1 Drawing Sheet

TWIST LOCK FLAT THRUST WASHER ASSEMBLY

INCORPORATION BY REFERENCE

The following documents are incorporated herein by reference as if fully set forth: U.S. Provisional Application No. 61/830,948, filed Jun. 4, 2013.

FIELD OF INVENTION

This application is generally related to a thrust washer and more particularly related to a friction fit thrust washer.

BACKGROUND

Thrust washers for torque converters are well known. Known two piece thrust washers are disclosed in U.S. Pat. No. 5,489,255. Two piece thrust washers typically include locking tabs that engage slots of a mating part. These types of thrust washers require precise alignment of the tabs and slots during assembly.

SUMMARY

It would be desirable to provide a thrust washer and mating component that is cost effective and does not include snap-fitting parts.

A thrust washer assembly including a washer and a ring is provided. The washer includes a circumferential outer surface that varies radially from an axis of the washer to define a plurality of ramps. The ring includes a plurality of axial protrusions that each includes an inner radial surface that, via a relative rotation of the washer to the ring, engages a radially outer surface of the plurality of ramps to connect the washer and the ring by a friction-fit connection.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
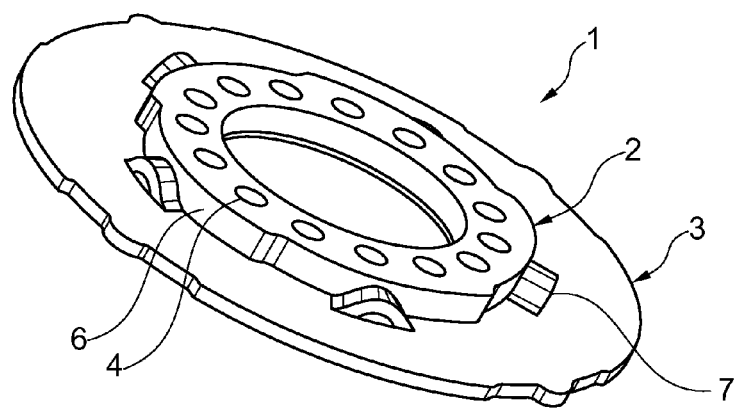
FIG. 1 is a perspective view of a preferred embodiment of a thrust washer assembly according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
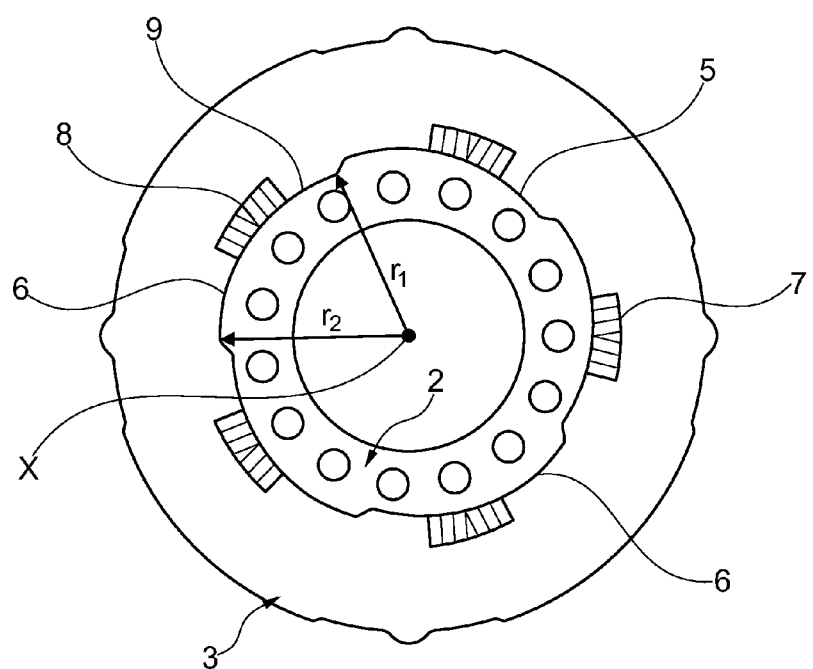
FIG. 2 is a plan view of the thrust washer assembly.

FIGS. 1 and 2 show a preferred embodiment of a thrust washer assembly 1 according to the present invention. The thrust washer assembly 1 includes a washer 2 and a ring 3. The washer 2 includes a circumferential outer surface 5 that varies radially from an axis X of the washer 2 to define a plurality of ramps 6.

The washer 2 is preferably formed as a molded or extruded plastic part. Example washer materials include phenolic or polyether ether ketone (PEEK). The ramps 6 are preferably formed during molding or extruding the washer 2. The ramps 6 are preferably all aligned in a same direction. All of the ramps 6 preferably have the same profile. Preferably, there are five ramps 6 on the washer 2. Alternatively, there can be four ramps 6 located 90° apart from each other or eight ramps 6 located 45° apart from each other. Those skilled in the art will recognize that the number and spacing of the ramps can be varied. The ramps 6 preferably increase in radial height by 4-10% over approximately 60°, and most preferably increase in radial height by about 4.5%. The radial height of a ramp 6 is measured by the radial distance (r1) from the axis X of the washer 2 at one point of the ramp and the radial distance (r2) from the axis X of the washer 2 at another point at an opposite end of the same ramp (r2). The variation in radial height of the ramp 6 is calculated by the equation: $(r2-r1)/r1$.

The ring 3 includes a plurality of axial protrusions 7 that each include an inner radial surface 8 that, via a relative rotation of the washer 2 to the ring 3, engages a radially outer surface 9 of the plurality of ramps 6 to connect the washer 2 and the ring 3 by a friction-fit connection. The ring 3 and protrusions 7 may be similar to those shown and described in commonly-assigned U.S. Pat. No. 8,371,116, which is incorporated by reference. The ring 3 is preferably formed as a stamped sheet metal part. The axial protrusions 7 are preferably formed by stamping the ring 3. The washer 2 and the ring 3 include axial end surfaces that rest on each other. The protrusions 7 preferably have an axial height that is at least 50% of an axial thickness of the washer 3. Those of ordinary skill in the art recognize that other ratios of the axial height of the protrusions 7 to the axial thickness of the washer 3 can be used, particularly as the thickness of the washer 3 increases.

The inner radial surface 8 of each of the plurality of axial protrusions 7 engage a respective one of the plurality of ramps 6 at a contact point. The contact point is preferably along a circumferential end point of the axial protrusion 7. The washer 2 can include a plurality of axially extending holes 4 to lighten the washer 2 and/or add radial flexibility to the ramps 6, allowing for easier assembly of the thrust washer assembly 1 as well as a tighter fit once assembled. The inner radial surfaces 8 of the plurality of axial protrusions 7 can have an arcuate form with a radially inner surface having a constant radius measured from the axis X of the washer 2, or a straight chordal form in which the radius of the radially inner surface varies with respect to the axis X of the washer 2. The number of ramps 6 to protrusions 7 can be one to one. Alternatively, multiple protrusions 7 can be provided for each ramp 6.

Having thus described various embodiments of the present thrust washer assembly in detail, it will be appreciated and apparent to those skilled in the art that many changes, only a few of which are exemplified in the detailed description above, could be made in the thrust washer assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

REFERENCE NUMBERS

1 Thrust Washer Assembly
2 Washer

3 Ring
4 Holes
5 Circumferential Outer Surface of Washer
6 Ramps
7 Protrusions
8 Inner Radial Surface of Protrusions
9 Outer Radial Surface of Ramps
X Axis of Washer

What is claimed is:

1. A thrust washer assembly, comprising:
   a washer including a circumferential outer surface, the circumferential outer surface varying radially from an axis of the washer to define a plurality of ramps; and
   a ring including a plurality of axial protrusions, the plurality of axial protrusions each including an inner radial surface that, via a relative rotation of the washer to the ring, engages a radially outer surface of the plurality of ramps to connect the washer and the ring by a friction-fit connection.

2. The thrust washer assembly of claim 1, wherein the inner radial surface of each of the plurality of axial protrusions engages a respective one of the plurality of ramps at a contact point.

3. The thrust washer assembly of claim 1, wherein the washer includes a plurality of axially extending holes.

4. The thrust washer assembly of claim 1, wherein the inner radial surfaces of the plurality of axial protrusions have an arcuate form having a constant radius measured from the axis of the washer.

5. The thrust washer assembly of claim 1, wherein the inner radial surfaces of the plurality of axial protrusions have a chordal form having a radius that varies with respect to the axis of the washer.

6. The thrust washer assembly of claim 1, wherein the plurality of ramps all face in a same circumferential direction.

7. The thrust washer assembly of claim 1, wherein the ring is a stamped sheet metal part.

8. The thrust washer assembly of claim 1, wherein the plurality of protrusions are formed by stamping.

9. The thrust washer assembly of claim 1, wherein the washer is a molded or extruded plastic part.

10. The thrust washer assembly of claim 1, wherein the ramps vary from 4%-10% in radial height from the axis of the washer.

11. A thrust washer assembly, comprising:
    a washer including a circumferential outer surface, the circumferential outer surface varying radially from an axis of the washer to define a plurality of ramps that vary in radial height; and
    a ring including a plurality of stamped axial protrusions and an axial end surface that engages an axial end surface of the washer, the plurality of axial protrusions each extending from the ring by at least 50% of an axial thickness of the washer and each including an inner radial surface that, via a relative rotation of the washer to the ring, engages a radially outer surface of the plurality of ramps to connect the washer and the ring by a friction-fit connection.

12. The thrust washer assembly of claim 11, wherein the ramps vary from 4-10% in radial height from the axis of the washer.

13. The thrust washer assembly of claim 11, wherein there are at least four ramps.

14. The thrust washer assembly of claim 11, wherein a ratio of ramps to axial protrusions is one to one.

* * * * *